United States Patent
Schumacher et al.

(10) Patent No.: US 7,526,853 B2
(45) Date of Patent: May 5, 2009

(54) METHOD FOR HANDLING A STATOR BAR

(75) Inventors: David Robert Schumacher, Scotia, NY (US); Yu Wang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 266 days.

(21) Appl. No.: 11/196,236

(22) Filed: Aug. 4, 2005

(65) Prior Publication Data
US 2006/0108728 A1    May 25, 2006

Related U.S. Application Data

(60) Provisional application No. 60/628,931, filed on Nov. 19, 2004.

(51) Int. Cl.
*H02K 15/04* (2006.01)
(52) U.S. Cl. .......... 29/596; 29/402.01; 29/505; 29/737; 29/759; 228/262.9

(58) Field of Classification Search ............ 29/745, 29/750, 758, 760, 762, 764, 564.3, 564.4, 29/564.5, 566.1, 566.3, 566.4, 828, 596, 29/592.1, 402.01, 505, 737, 759; 269/288, 269/295, 87.2; 30/90.1, 90.2, 90.6, 286, 30/288, 289; 228/262.9
See application file for complete search history.

(56) References Cited

U.S. PATENT DOCUMENTS

| | | | |
|---|---|---|---|
| 7,243,414 B2 * | 7/2007 | Even ................... | 29/732 |
| 2003/0072643 A1 * | 4/2003 | Oliver et al. ......... | 414/745.1 |

* cited by examiner

*Primary Examiner*—A. Dexter Tugbang
*Assistant Examiner*—Livius R Cazan
(74) *Attorney, Agent, or Firm*—Nixon & Vanderhye, P.C.

(57) ABSTRACT

A cradle for a stator bar including: a platform having a length extending at least two-thirds the stator bar; a plurality of clamps arranged along the length of the platform and at least one end turn gripper at each end turn of the stator bar, wherein the end turn clamps are arranged on adjustable arms of the platform, and a coupling at a center of the platform, wherein the coupling engages an elevator device.

13 Claims, 10 Drawing Sheets

METHOD FOR HANDLING A STATOR BAR

RELATED APPLICATION

This application claims the benefit of U.S. Provisional Application Ser. No. 60/628,931, entitled "Generator Stator Bar Handling, Brazing, and Processing" and filed in the U.S. Patent and Trademark on Nov. 19, 2004, the entirety of this provisional application is incorporated by reference herein.

BACKGROUND OF THE INVENTION

The present invention relates to large stator bars that are used in power and industrial generators, handling these bars before they are installed in a stator, and fitting header clips to the bars during assembly.

Stator bars are typically large, long and heavy, e.g., 35 feet long and hundreds of pounds (lbs.). The bars are generally straight and extend the length of a stator. When seated in a stator, the straight sections of the stator bars form a cylindrical array around a rotor. The ends of the stator bars extend axially from opposite ends of the stator. The end portion of the stator bars extend from the ends of the stator and are curved to form end turns. The ends of stator bars are connected through copper or stainless steel fittings and water-cooled connections to form continuous hydraulic winding circuits.

To hold the bar vertically there is a need for a cradle that can hold a stator bar as it is positioned into alignment with a braze station and as the stator bar turns from a horizontal position to a vertical position.

BRIEF DESCRIPTION OF THE INVENTION

A cradle for a stator bar has been developed comprising: a platform having a length extending at least two-thirds the stator bar; a plurality of clamps arranged along the length of the platform and at least one end turn gripper at each end turn of the stator bar, wherein the end turn clamps are arranged on adjustable arms of the platform, and a coupling at a center of the platform, wherein the coupling engages an elevator device.

The cradle may alternatively comprise: a platform having a length extending at least two-thirds the stator bar, wherein the platform comprises beams and cross-bracing; a plurality of clamps arranged along the length of the platform and at least one end turn gripper at each end turn of the stator bar, wherein the end turn clamps are arranged on extendable or retractable arms of the platform, and a coupling at or near a center of the platform, wherein the coupling engages an elevator device.

A method has been developed for handling a stator bar comprising: mounting a stator bar on a cradle, wherein the cradle comprises a plurality of clamps adjacent stator bar when the bar is in the cradle, wherein the clamps include a end clamps at opposite ends of the cradle; adjusting a longitudinal position of the end clamps to accommodate a length of the stator bar; grasping opposite sides of the bar with each of the clamps; lifting the cradle with stator bar from a platform, wherein the cradle and stator bar are in a substantially horizontal orientation on the platform; turning the cradle and stator bar from the horizontal orientation to an orientation at least 45 degrees off horizontal; aligning an upper end of the bar with a brazing station; turning the bar to reverse positions of the ends of the bar, and returning the cradle and stator bar to a horizontal orientation.

DETAILED DESCRIPTION OF THE INVENTION

Figure 1:
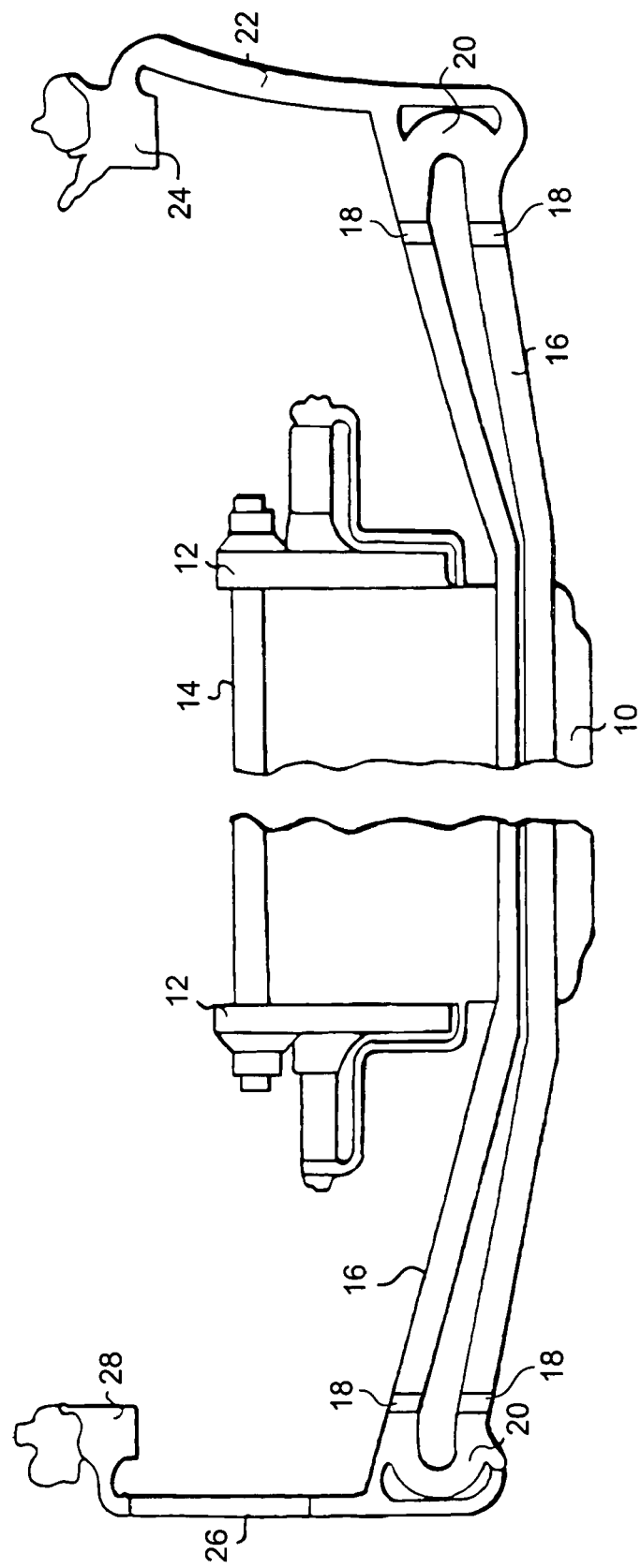
FIG. 1 is a schematic illustration of a liquid-cooled stator winding arrangement illustrating the stator, stator bars and hydraulic header clips coupled to inlet and outlet coolant headers.

FIG. 1 illustrates a liquid-cooled stator bar arrangement for a stator in a typical liquid-cooled generator. A stator core 10 has stator core flanges 12 and core ribs 14. Stator bars 16 (also referred to as armature winding bars) pass through radially extending slots in the stator core and are capped at opposite ends by hydraulic header clips 18 fitted to the ends of the bars. Inlet hoses 22 connect an inlet clip 18 to an inlet coolant header 24. Outlet hoses 26 connect an outlet clip 18 to an outlet coolant header 28. Each stator bar forms a half an armature coil. A pair of stator bars linked at their opposite ends form a complete armature coil. Copper or stainless steel fittings 20 connect adjacent ends of the stator bar pairs to form the complete armature coil.

Figure 2:
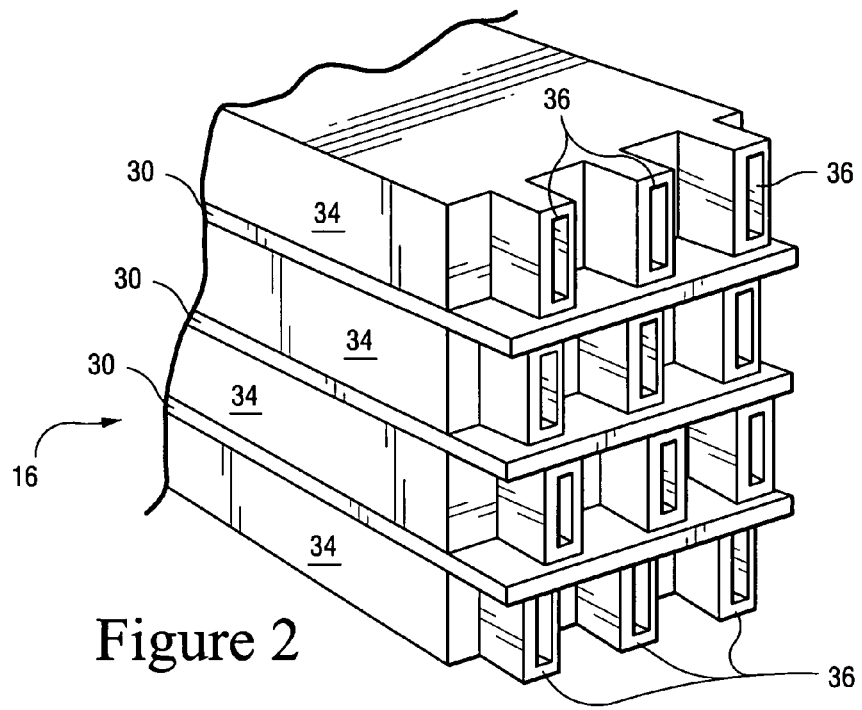
FIG. 2 is a perspective view of the end of an armature winding bar showing the tiered rows of hollow and solid strands, and interleaving sheets of braze material.
Figure 3:
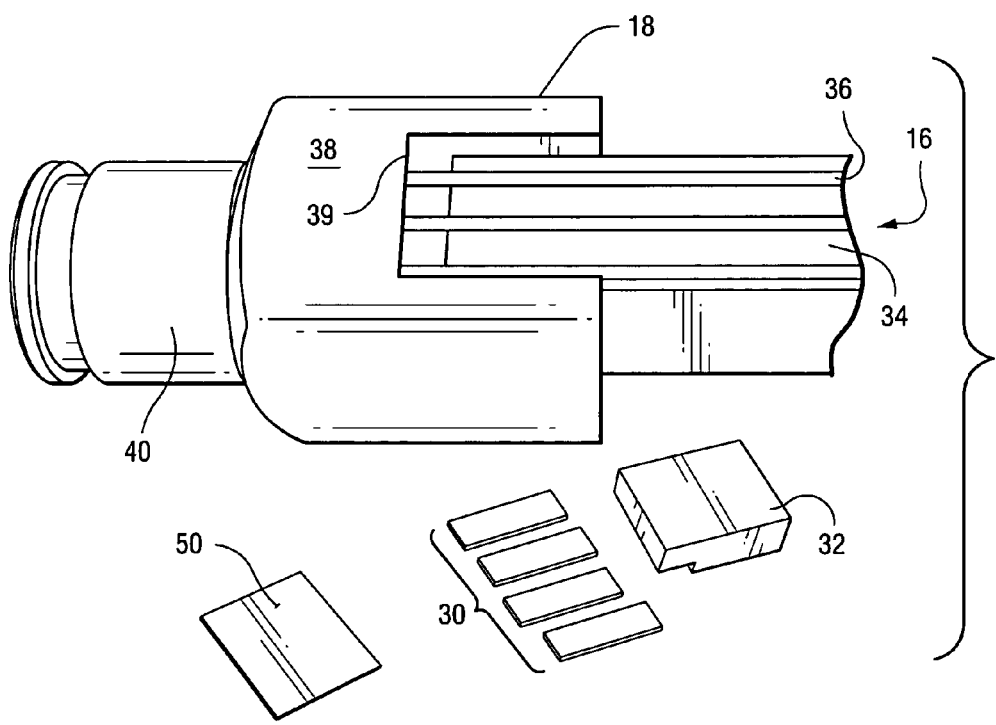
FIG. 3 is a perspective exploded view of the end of an armature winding bar inserted into a hydraulic header clip, with braze material and a clip cover shown to the side of the clip.

FIG. 2 is a perspective end view of an stator bar 16 without a hydraulic header clip. The bar is a rectangular array of solid 34 and hollow 36 copper strands. FIG. 3 is a perspective view of the end of an armature winding bar 16 inserted in a clip 18 with braze strips 30 and a braze sheet 50. A clip cover 32 is shown to the side of the clip 18. In FIG. 2, the braze strips 30 are interleaved between tiered rows of solid the copper strands 34 and rows of hollow strands 36 of the bar 16. Just prior to brazing and at the end of the stator bar, braze strips are inserted between the strands 34, 36. In addition, the braze sheets 50 and clip 32 are assembled in the clip 18.

The hydraulic header clip 18 (also referred to as a stator bar clip) is formed of an electrically conductive material, such as copper. The clip 18 is hollow and includes a rectangular collar 38 that slides over the outer side surfaces of the end of the armature winding bar 16. A rectangular slot 39 in the collar receives the end of the armature winding bar and interleaved strips 30 of the braze alloy. The clip cover 32 fits into the matching rectangular slot 39 in the side of the collar 38. At the other end of the clip 18 is a cylindrical coupling end 40 that is configured to connect to the coolant circuit.

The pre-braze positioned braze alloy strips extend beyond the ends of the short solid strands. The height of the alloy pre-positioned before brazing is selected so that the braze alloy will entirely melt during the braze process and not flow into the open ends of the extended hollow strands.

During brazing, the stator bar is held in a vertical position and the end of the bar is horizontal. Melted braze alloy forms a pool over the solid strand ends of the stator bar. After brazing, the braze alloy forms a braze alloy isolation coating over the end of the armature bar (but not the end of the hollow strands). The isolation layer shields the solid strand ends and the joints from the coolant passage in the clip. The braze alloy also bonds the clip to the strands and the strand ends to each other.

Figure 4:
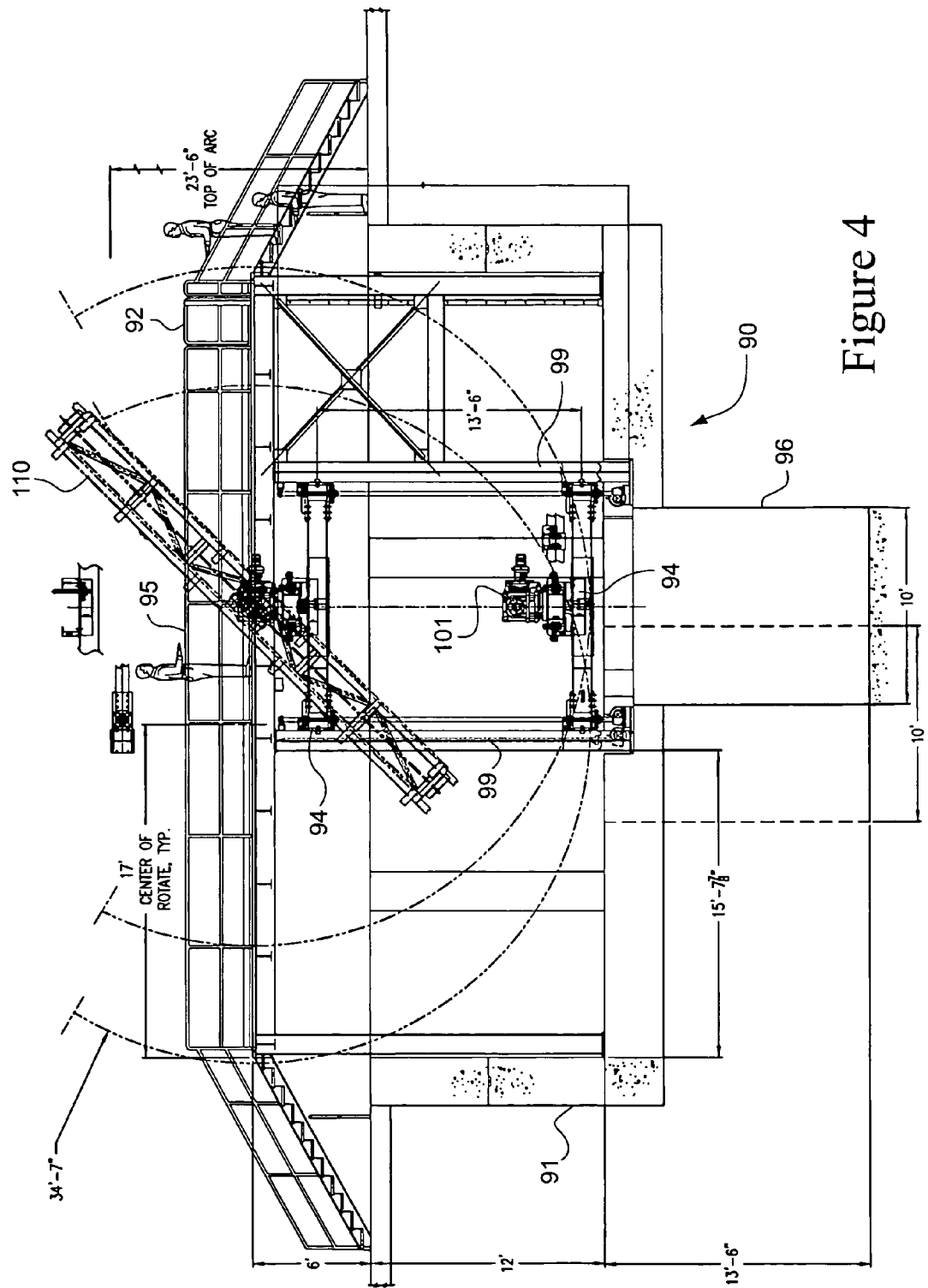
FIGS. 4, 5 and 6 are side, end and top views, respectively of a braze station for attaching end clips to winding bars. Line 4-4 in FIG. 6 indicates the view shown in FIG. 4. Line 5-5 in FIG. 6 indicates the view shown in FIG. 5.
Figure 5:
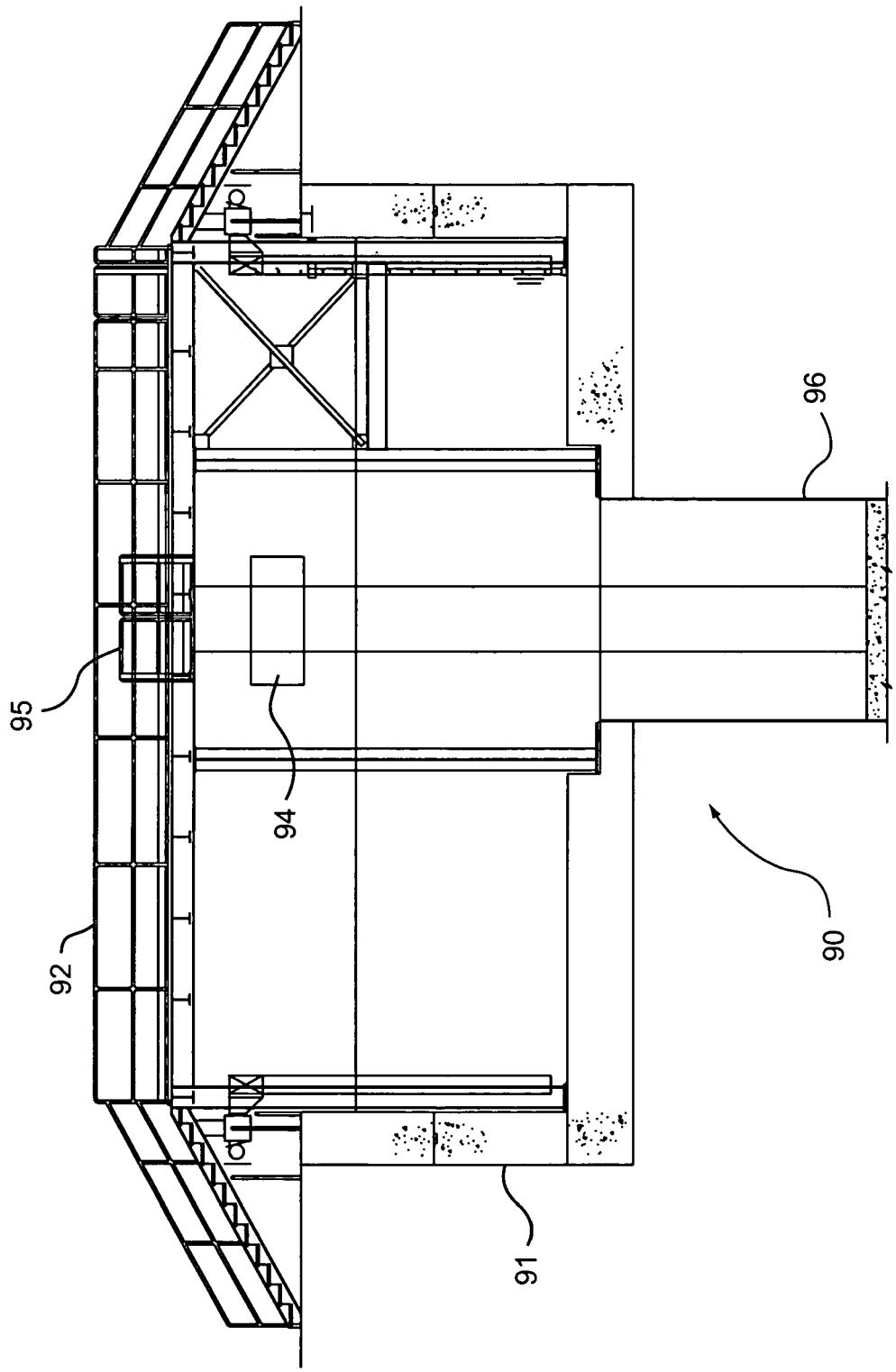
Figure 6:
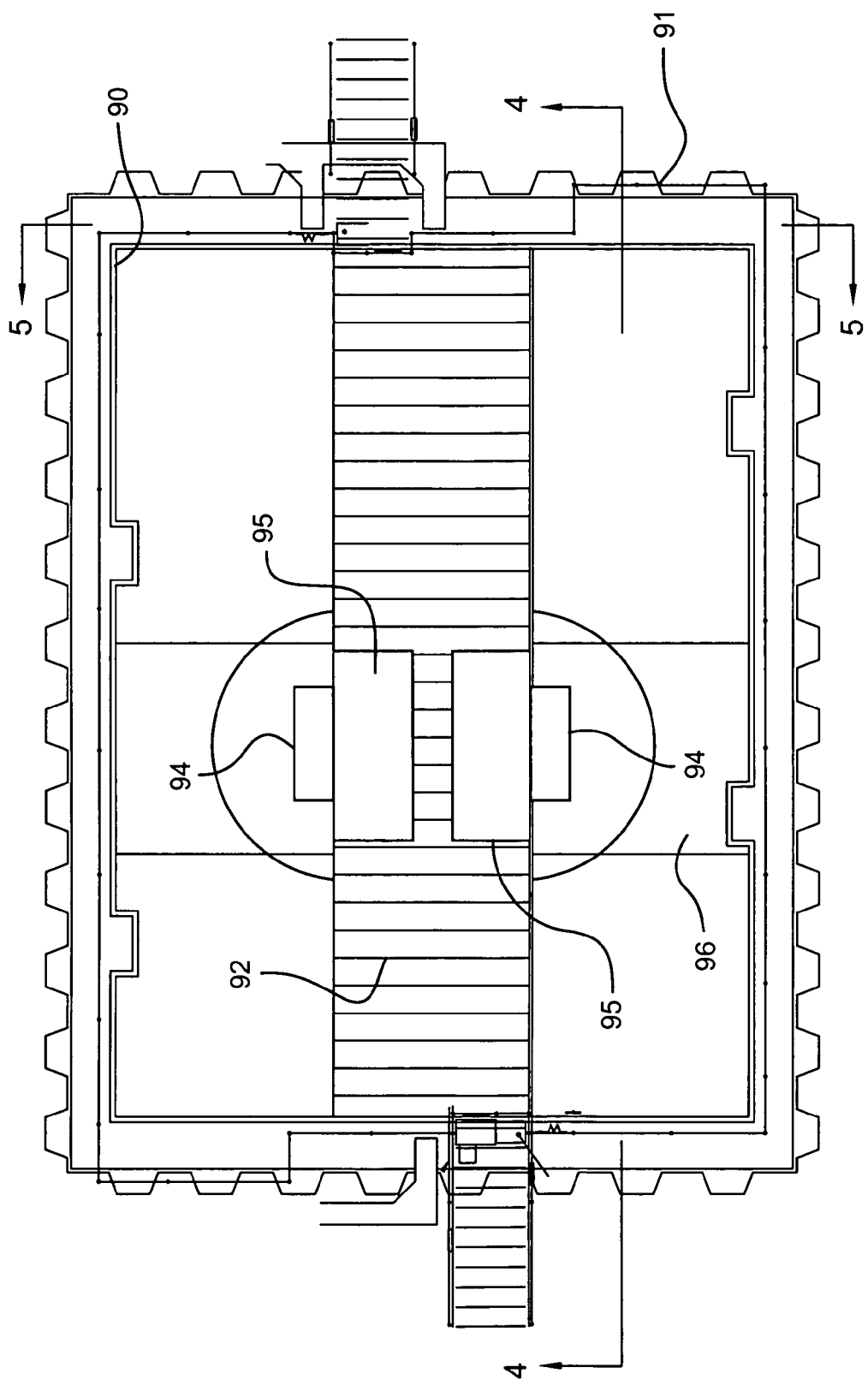

FIGS. 4, 5 and 6 are side, end and top views, respectively, of a braze station 90 for vertically brazing stator bars. The braze station 90 includes a pit 91, a bridge 92 over the pit and a stator bar elevator 94 extending form the bottom of the pit 91 to the bridge. The in-ground pit 91 provides a large volume within which to reposition stator bars, e.g., to rotate the bar in a vertical plane while the center of the bar is at the level of the bridge 92. The in-ground pit may have a depth of twelve (12) feet, a length of forty (40) feet and a width of thirty-two (32) feet (which is about the length of a stator bar). The dimensions disclosed herein are exemplary and a braze station may be designed with different dimension for a particular application of stator bars. The dimensions of the in-ground pit may be sufficient to allow a stator bar to be rotated about its center, where the bar center is at the elevation of the bridge and is generally aligned with the mid-point of the bridge length.

Within the in-ground pit 91 is a deep pit 96 that is vertically aligned generally with the braze workstation 94 and the mid-point of the bridge 95. The deep pit 96 may be cylindrical. The deep pit allows the stator bars to be lowered vertically until the upper end of the bar is level with the workstation. For example, the deep pit 96 may have a bottom that is below the bridge a distance equal to the length of a stator bar e.g., thirty-one and one-half feet, and the depth below ground level of twenty-three and one-half feet. The expense of excavation of the in-ground pit 91 and deep pit 96 is minimized by limiting the horizontal cross section of the deep pit 96 to an area sufficient to raise and lower a vertical stator bar and limiting the in-ground pit 91 to a depth sufficient to allow the stator bar to rotate about the upper limit of the distance traversed by the elevator 94.

The vertical braze station 90 may be in a factory bay with a roof that has sufficient less clearance, e.g., twenty-five feet, for handling of stator bars, such as to allow for a crane ceiling height. The bridge 92 in the station may be elevated to reduce the needed excavation depths of the pits 91, 96. The bridge 92 has workstations 95 to allow technicians to braze the ends of the stator bars which are held vertically within the pit. Associated with the bridge are brazing hoods and other equipment (not shown) needed to braze the hydraulic clips to the end of the stator bars. The stator bars are stored horizontally on storage platforms 98 on either or both sides of the pit 91. The platforms are substantially horizontal, but may be on a slight incline such as up to 10 degrees from horizontal. The bars may be mounted on cradles 110 (FIG. 13) at the platforms.

An elevator 94 in the pit and adjacent the bridge holds the stator bars while they are in the pit. Instead of an elevator, a crane or other stator bar handling mechanism may be used to move the stator bar from a platform 98 to the pit, and to rotate the bar so that it may be aligned with a workstation. The stator bars are supported by a cradle 110 that is latched to the elevator 94. One cradle may hold a pair of stator bars. The elevator 94 moves the stator bars with respect to the workstations 95 and storage platforms 98. The elevator moves the stator bars and cradle between the storage platforms 98 and the workstations, and turns the stator bars between horizontal and vertical positions. The elevator may comprise a pair of vertical rails 99 in a frame that is mounted over the deep pit 96 and sits on the floor of the shallower pit 91. An electric motor 101 drives the elevator 94 up and down the rails 99 and thereby raises and lowers the cradle 110 and stator bars. In addition, the motor 101 may rotate the cradle in a vertical plane.

Figure 7:
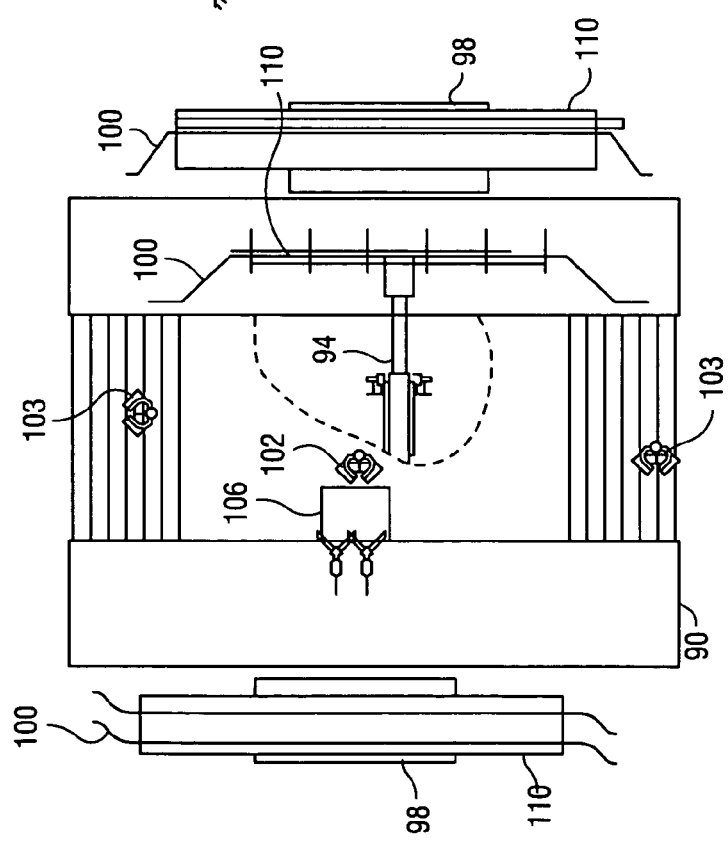
FIG. 7 is a top view of a braze station illustrating the loading of stator bars on the stator bar transport in the workstation pit.
Figure 10:
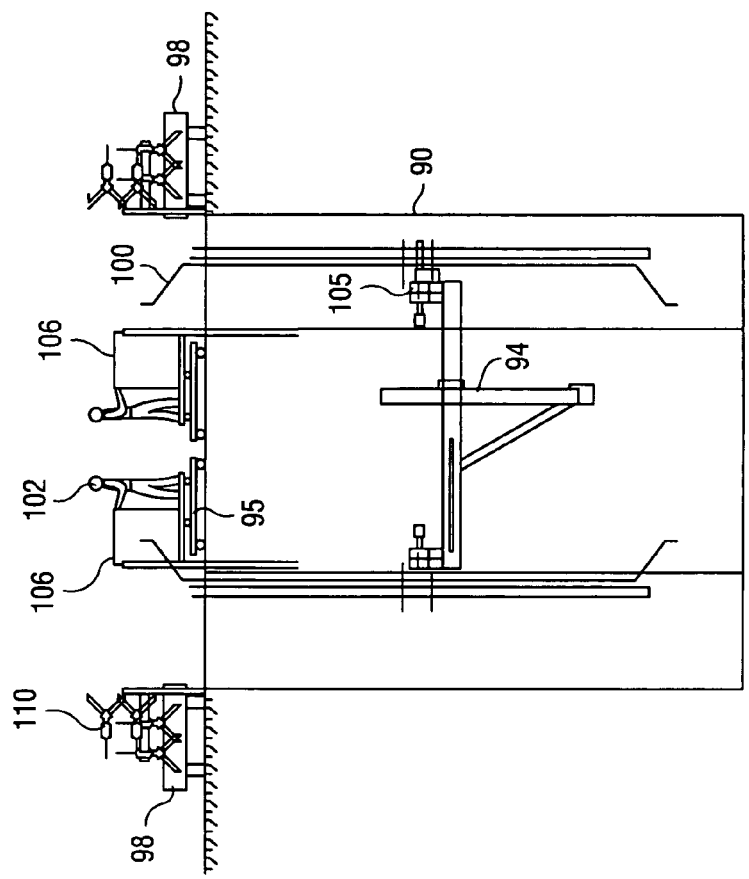
FIG. 10 is an end view of a braze station showing the stator bar turned to vertical position and being moved into position for brazing.

FIG. 7 is a schematic top view showing the loading of a stator bar 100 and cradle 110 from the loading platform 98 to the elevator 94. A dash line through the bridge shows the elevator 94 underneath the bridge. A workman 102 stands at the workstation 95 that moves up and down. As shown in FIG. 7, the workman 102 may be at the same level as are other work persons 103 on the bridge. In contrast, FIG. 10 shows that the workstation 95 may move vertically to better position the workman and the braze hood 106 with respect to the end of the stator bar.

Figure 8:
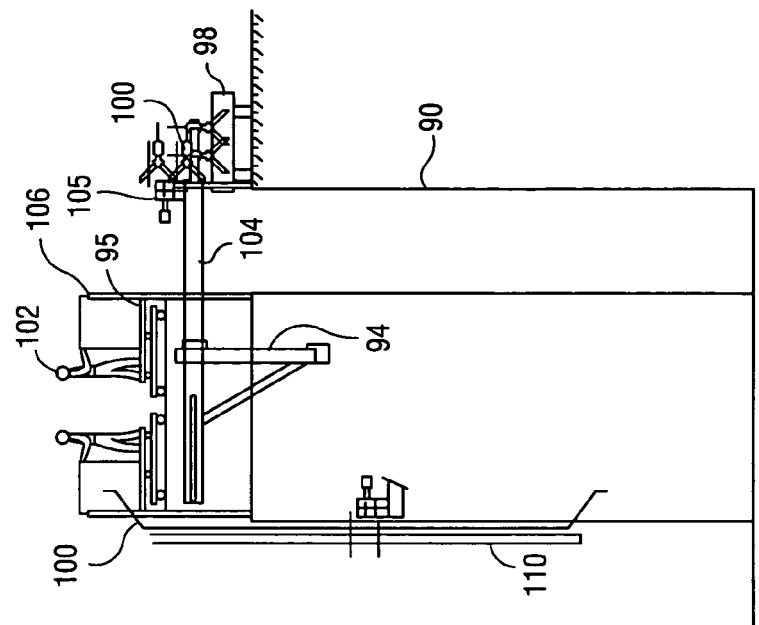
FIG. 8 is a side view of the braze station showing the stator bar transport extended to receive a stator bar from a loading station.

As shown in FIG. 8, the elevator 94 extends its arm 104, e.g., telescoping arm, outward to grasp a cradle 110 with one or more stator bars from the loading platform 98. The arm has on a distal end a coupling and latching mechanism 105, which may be a pair of fingers that grasp a connection on a cradle holding the stator bars. The latching mechanism further comprises a rotational attachment that enables the stator bar and its cradle to be rotated in a vertical plane about the distal end of the elevator arm 104.

The stator bars 100 are in a horizontal position as they are moved from the storage platform 98 to the pit 91. The elevator 94 raises the cradle and its stator bars and turns the cradle and bars to a vertical orientation. Raising the stator bars allows the cradle and stator bars to be lifted off the platform. The vertical stator bars are lowered so that their upper ends are within reach of the workstation 95. The workstation 95 may be raised or lowered and moved to the left or right (parallel to the bridge) to be properly positioned with respect to the stator bar ends. In addition, the elevator arm 104 may retract or extend the bars 100 (in a direction perpendicular to the bridge) to assist in positioning the bars with respect to the workstation. The braze station may provide six degrees of motion to position the ends of the stator bars in the braze hood. The six degrees are: up-down of bars and workstation, forward-back of bars, left-right of workstation.

Figure 9:
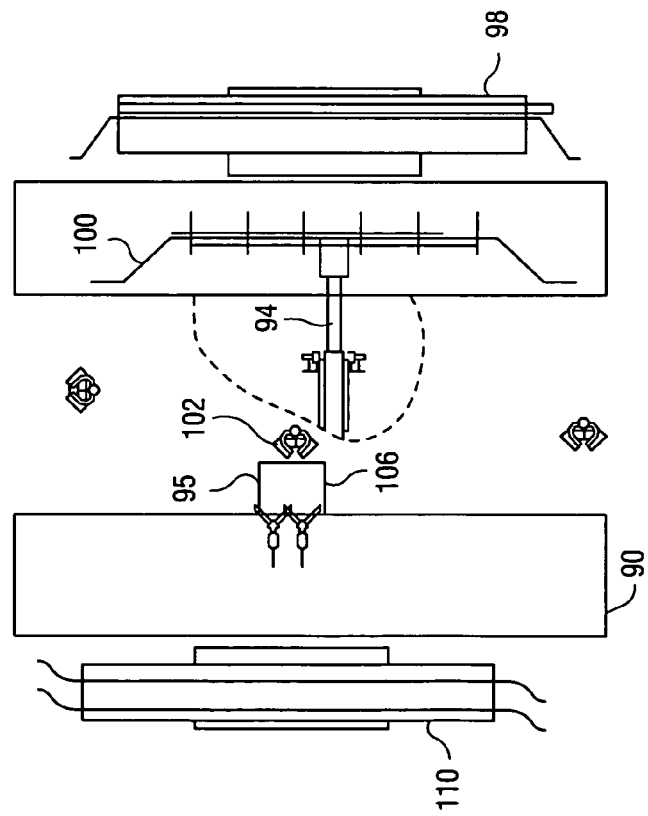
FIG. 9 is a top view of the braze station showing the transport moving the stator bar over the pit.

The workstation may include a braze housing 106 that is used to heat and braze the end of the stator bar to the clip. At the workstation 95, the upper ends of the stator bars are mounted in the brazing hood 106 where the clip is brazed to the stator bar. The workstation 95 may be raised or lowered (compare FIGS. 8 and 10) to orient the workstation to the best position with respect to the end of the stator bar. Once the clips have been brazed to the stator bars, the elevator arm 104 extents the stator bars and rotates them 180° (see circular arcs in FIG. 4) to bring the opposite ends of the stator bars up to the workstation 95, as is shown in FIGS. 9 and 10. When both ends of the stator bars have been brazed with hydraulic clips, the elevator 94 turns the stator bars to a horizontal position and the arm 104 extends to move the stator bars and cradle back to the loading platform 98.

Figure 11:
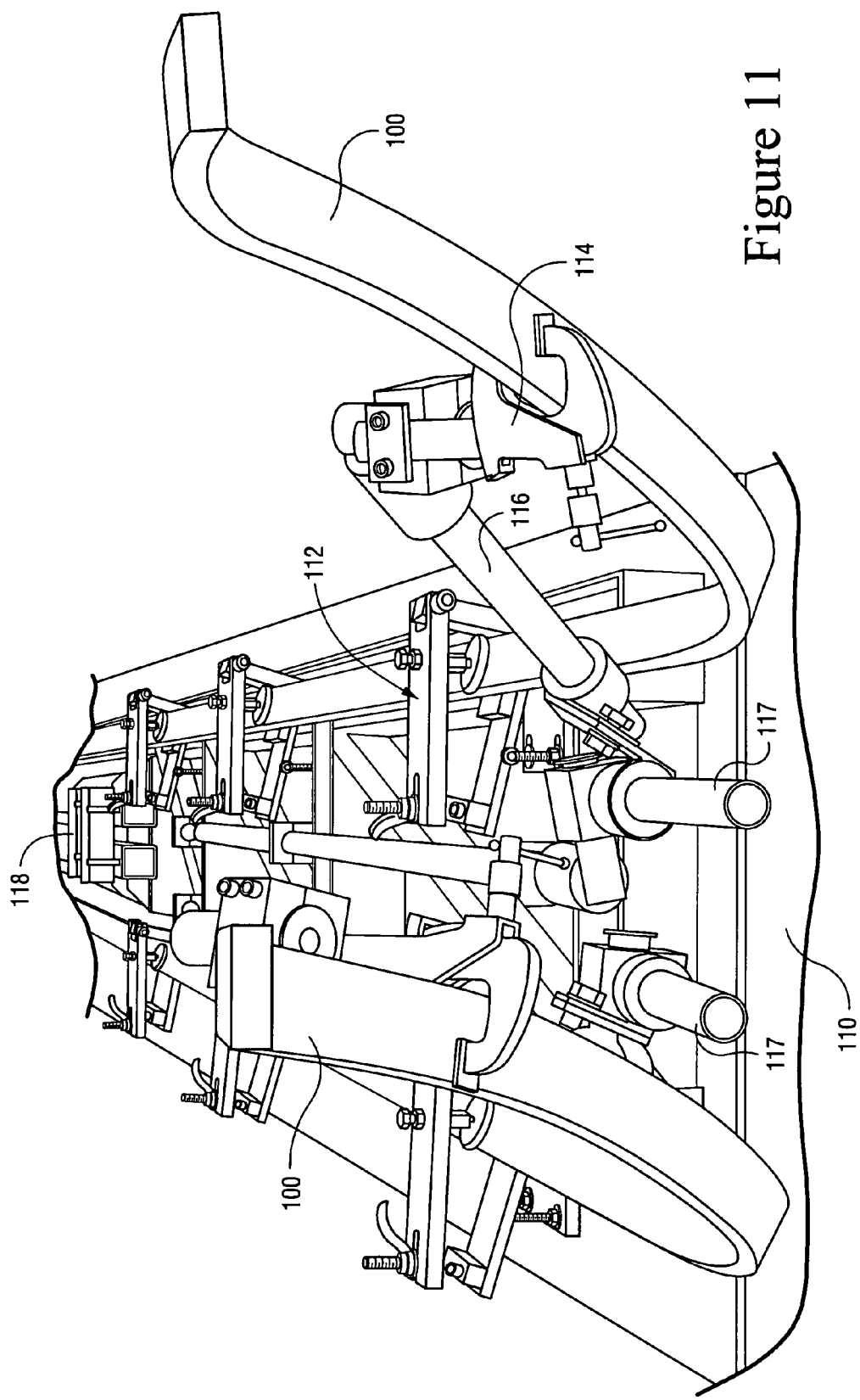
FIG. 11 is an end perspective view of a cradle for holding stator bars in the braze station.

FIG. 11 is a perspective end view of a stator bar cradle 110 and with two stator bars 100 mounted thereon. The cradle 110 is a rectangular frame having longitudinal beams and crossbeams that provide a rigid support for the stator bars. The stator bars may be loaded on the cradle at the platform 98 adjacent the braze station 90.

A stator bar holding cradle 110 secures a stator bar as the hydraulic header end clips are attached to the bar. The cradle is a protective device to avoid direct handling of the bars and avoid damage to the bars. In addition, the cradle serves as an interface to the elevator 94 to ensure an engagement for multi-positional handling by the elevator. The stator bar holding cradle 110 provides multi-positional handling of the stator bar. The cradle has at least three and preferably six degrees of freedom restraints on the bar for vertical position operation.

The restraint system for the cradle 110 comprises angle adjustable two side-clamping gripers 112 arranged in an array along the length of the cradle. There may be for example six stator bar grippers 112 spaced evenly along the length of the cradle to grasp the straight section of a stator bar. These grippers are arranged lengthwise along the stator bar sled and are pivotably attached to the sled. The pivoting movement allows the grippers to adjust for slight bowing and other variations in the stator bar. The clamp gripers 112 grasp the straight section of a stator bar 100. At each end turn section of the bar are two adjustable arms with end-turn clamp grippers 114 to grasp the end turns. The end adjustable grippers 114 have hydraulic expandable arms 116 that are adjusted to fit different bar arm lengths. The cradle 110 has a 90-degree (perpendicular) dual pin coupling system 118 to securely engage with a cradle connector, e.g., a pair of fingers, on the elevator 94.

The dual pin handling engagement and locking mechanism 118 may be at the center of the cradle. The dual pin mechanism may be a bracket of a pair of rectangular tubes that receive fingers from the elevator. The fingers engage the rectangular tubes and are locked to the tubes so that the cradle is securely attached to the elevator 94. There may be two pairs of tubes arranged at 900 so as to receive the fingers from the elevator from two orthogonal directions.

The cradle also includes a shaft 117 along the length of the sled and associated with each of the stator bar gripper arrays. This shaft 117 is a platform to allow axial adjustments to the arms 116. The arms retract and extend along the shaft to align with the end turns of stator bars having different lengths for each different bar arm shape. The arms may be hydraulically driven to accommodate stator bars of different lengths.

Figure 12:
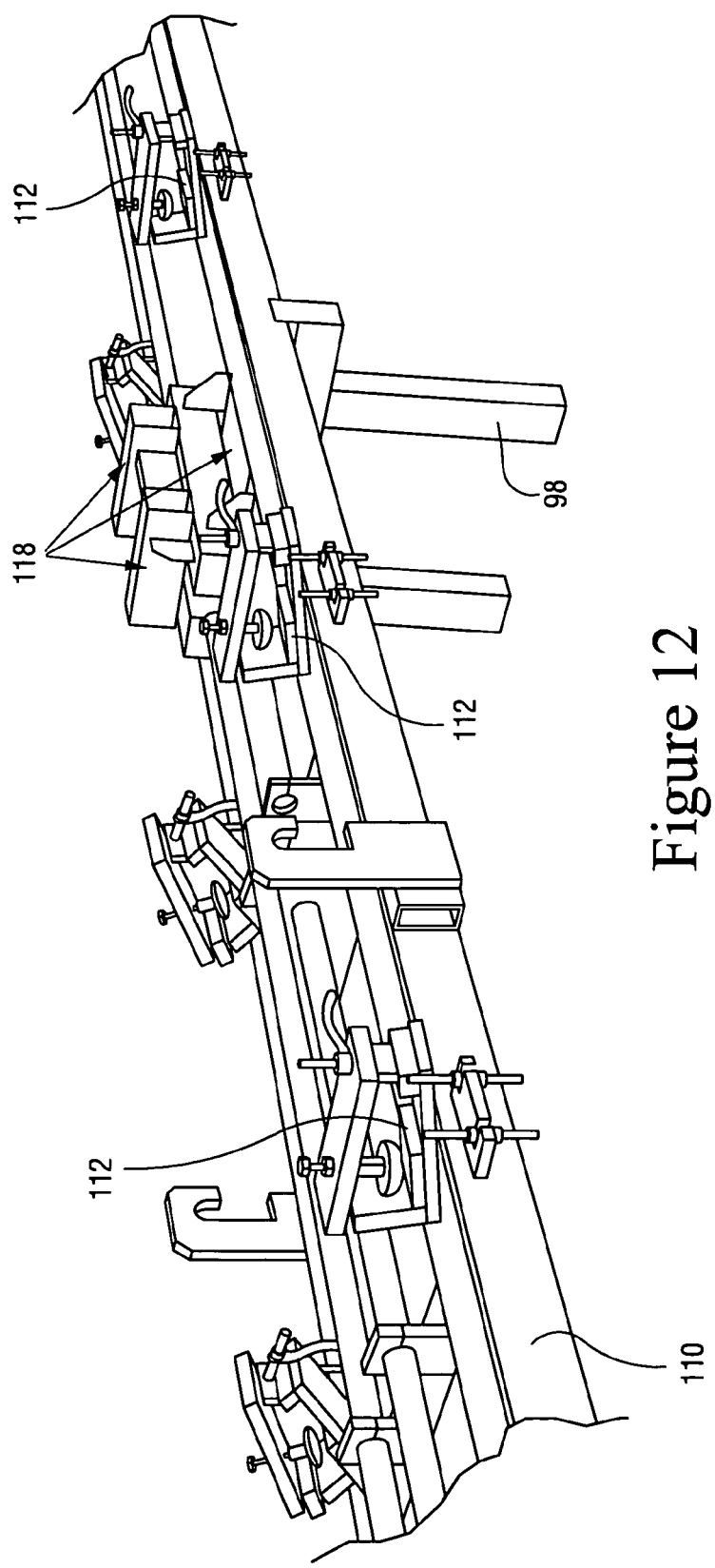
FIG. 12 is a side perspective view of the cradle shown in FIG. 11.

FIG. 12 is a perspective side view of the stator bar cradle. The handling device and engagement locking mechanisms are more clearly shown in this figure. In addition, the grippers are shown as being pivotably attached to the sled. The pivoting motion of the grippers allows them to adjust to the stator bars while still providing a secure support for the stator bars.

Figure 13:
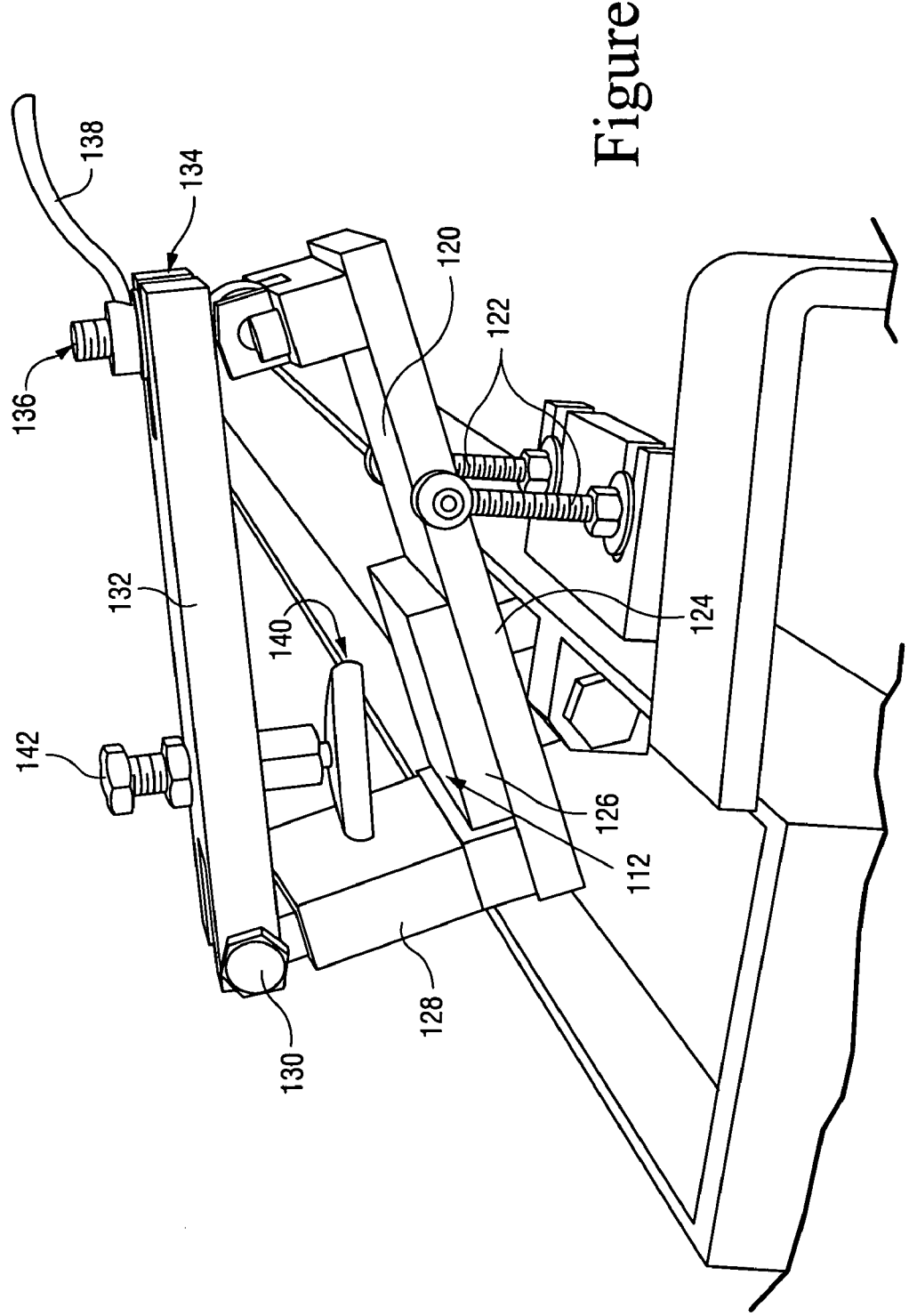
FIG. 13 is an adjustable clamp for holding a stator bar on the cradle.

FIG. 13 is a perspective side view of one of the adjustable stator bar grippers 112. The grippers have an elevated pivot point 120 that is fixed to the stator bar sled by a height adjustable threaded shaft 122. The pivot point is attached to bottom planar brace 124 having a relatively soft pad 126 for receiving the stator bars. At one end of the brace is a upstanding column 128 having at an upper end a pivot attachment 130 to a top planer brace 132. The top brace pivots upward to receive the stator bar and then closes to grip the bar. The top brace 132 has an opposite end with a slot 134 that receives an engagement shaft 136 pivotably mounted on the end of the bottom brace 124. The engagement shaft 136 may be threaded and have a thumb screw 138 which when released, allows the threaded shaft to pivot out of the slot from the top brace. The thumb screw is tightened to secure the shaft 136 in the slot 134 of the upper brace 132.

The top brace further includes a gripper pad 140, which may be a rubberized, that extends downwards and towards the pad on the bottom brace. The stator bar is held between the rubberized gripper pad 140 and the pad 126 on the bottom brace 124. A threaded shaft and screw arrangement 142 adjusts the distance between the upper brace 132 and the gripper pad, and may be used tighten the pad onto the stator bar.

In operation, the adjustable bar gripper clamp 112 is opened by releasing the thumb screw 138 and pivoting the threaded shaft 136 out from the slot 134 in the upper bracket 132. The upper bracket is pivoted 130 to open the clamp and receive the stator bar. Once the stator bar is positioned on the bottom pad 126, the upper brace 132 is closed and the thumb screw 138 tightened to secure the upper brace to the lower brace 124. If needed, the rubberized gripper pad 140 is moved downward by tightening the screw shaft 142 coupling the gripper to the upper bracket.

The cradle provides several advantages for support stator bars. These advantages include (without limitation): support the bar with respect to six degrees of lateral movement (up-down, left-right, and forward-back) and rotation; angle adjustable gripper clamps 112 having two sided-clamping gripers along the straight section of the bar; adjustable arms with grippers at each cradle end to hold the end-turn portion of a stator bar; the adjustable arms have hydraulic expandable section to accommodate different lengths of stator bars; capability of holding two (or more) stator bars; a 90-degree (perpendicular) dual pin coupling system to securely engage (grab and lock) with bar handling system, e.g., elevator.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for handling a stator bar comprising:
    mounting a stator bar on a cradle;
    connecting a transport device to the cradle;
    transporting the cradle and stator bar using the transport device, which is on a surface supporting the transport device;
    positioning the cradle and stator bar over an open volume at a reduced elevation as compared to the surface supporting the transport device;
    while the stator bar is over the open volume, rotating the cradle and stator bar at least 45 degrees of rotation to position a portion of the stator bar down into the open volume at the reduced elevation, such that the portion of the stator bar is at an elevation below the surface supporting the transport device, and
    aligning an upper end of the stator bar with a brazing station at an elevation at or above the elevation of the surface supporting the transport device.

2. The method of claim 1 wherein transporting comprises turning the cradle and stator bar from a horizontal orientation to an orientation at least 45 degrees off horizontal.

3. The method of claim 2 wherein the aligning step further comprises aligning the upper end of the stator bar in a substantially vertical orientation with the brazing station and the method further comprises turning the stator bar substantially 180 degrees to align another end of the stator bar with the brazing station.

4. The method of claim 1 wherein the stator bar is mounted on the cradle when the cradle is on a platform, the step of transporting the cradle and stator bar comprises lifting the cradle from the platform, and the method further comprises transporting the cradle and stator bar to the platform after brazing at least one end of the stator bar.

5. The method of claim 1 wherein clamps on the cradle grasp opposite sides of the stator bar at a plurality of locations along a length of the stator bar.

6. The method of claim 5 wherein the clamps further comprise end clamps grasping end sections of the stator bar and the end clamps adjust longitudinally to accommodate the length of the stator bar.

7. The method of claim 1 wherein the open volume is defined by a pit and the brazing station is no lower than a top of the pit.

8. A method for handling a stator bar comprising:
mounting a stator bar on a cradle, wherein the cradle comprises a plurality of clamps adjacent to the stator bar when the stator bar is on the cradle, wherein the clamps include end clamps at opposite ends of the cradle;
wherein the mounting of the stator bar includes adjusting a longitudinal position of the end clamps to accommodate a length of the stator bar, and grasping opposite sides of the stator bar with each of the clamps;
after the stator bar is mounted on the cradle, lifting the cradle and stator bar from a platform, wherein the cradle and stator bar are in a substantially horizontal orientation on the platform;
after lifting the cradle and stator bar, turning the cradle and stator bar from the horizontal orientation to an orientation at least 45 degrees off horizontal;
while turning the cradle and stator bar, positioning a lower end of the stator bar in a pit having a bottom at a lower elevation than the platform;
after positioning the lower end of the stator bar, aligning an upper end of the stator bar with a brazing station at an elevation at least as high as a top of the pit;
after aligning the upper end of the stator bar, turning the stator bar to reverse positions of the lower end and the upper end of the stator bar, and
after turning the stator bar, returning the cradle and stator bar to a horizontal orientation.

9. The method of claim 8 wherein adjusting the longitudinal position of the end clamps includes extending or retracting an arm supporting the end clamps.

10. The method of claim 8 further comprising pivoting the clamps with respect to the cradle as the clamps grasp the stator bar.

11. The method of claim 8 further comprising lowering a center portion of the cradle with the stator bar to an elevation below the top of the pit.

12. A method for handling a stator bar comprising:
mounting a stator bar on a cradle, wherein mounting the stator bar on the cradle occurs no lower than a first elevation;
after mounting the stator bar on the cradle, connecting a transport device to the cradle such that the transport device avoids substantial direct contact with the stator bar;
transporting the cradle and stator bar using the transport device;
after transporting the cradle and stator bar, positioning the cradle and stator bar over an area at a second elevation which is lower than the first elevation and lower than the transport device;
after positioning the cradle and stator bar, lowering the transport device with the cradle and stator bar to an elevation below the first elevation;
after positioning the cradle and stator bar, rotating the cradle and stator bar such that a portion of the stator bar is below the transport device and below the first elevation, and
after rotating the cradle and stator bar, aligning an upper end of the stator bar with a brazing station at or above the first elevation.

13. The method of claim 12 further comprising lowering a center section of the cradle with the transport device below the first elevation.

* * * * *